350-392 SR

XR 3,675,220

United States — Snaper et al. — [15] 3,675,220 — [45] July 4, 1972

[54] PLANAR RANDOM ACCESS FERROELECTRIC COMPUTER MEMORY

[72] Inventors: Alvin A. Snaper; George D. Gregory; Miles R. Munroe, all of Las Vegas, Nev.

[73] Assignee: Advanced Patent Technology, Inc., Las Vegas, Nev.

[22] Filed: Nov. 30, 1970

[21] Appl. No.: 93,551

[52] U.S. Cl. ....................340/173.2
[51] Int. Cl. ....................G11c 11/22
[58] Field of Search ....................340/173.2

[56] References Cited

UNITED STATES PATENTS

| | | | |
|---|---|---|---|
| 3,593,318 | 7/1971 | Browning | 340/173.2 |
| 3,559,185 | 1/1971 | Burns et al. | 340/173.2 |

*Primary Examiner*—Stanley M. Urynowicz, Jr.
*Attorney*—Allen E. Botney

[57] ABSTRACT

This memory device uses ferroelectric materials and it stores information as a change in the crystalline formation of the ferroelectric material. In turn, this change manifests itself as a change in the light intensity of polarized light incident upon the ferroelectric bits.

1 Claim, 1 Drawing Figure substrate
polarizer
transparent conductors
ferroelectric squares
transparent conductors
memory bits
transparent conductors

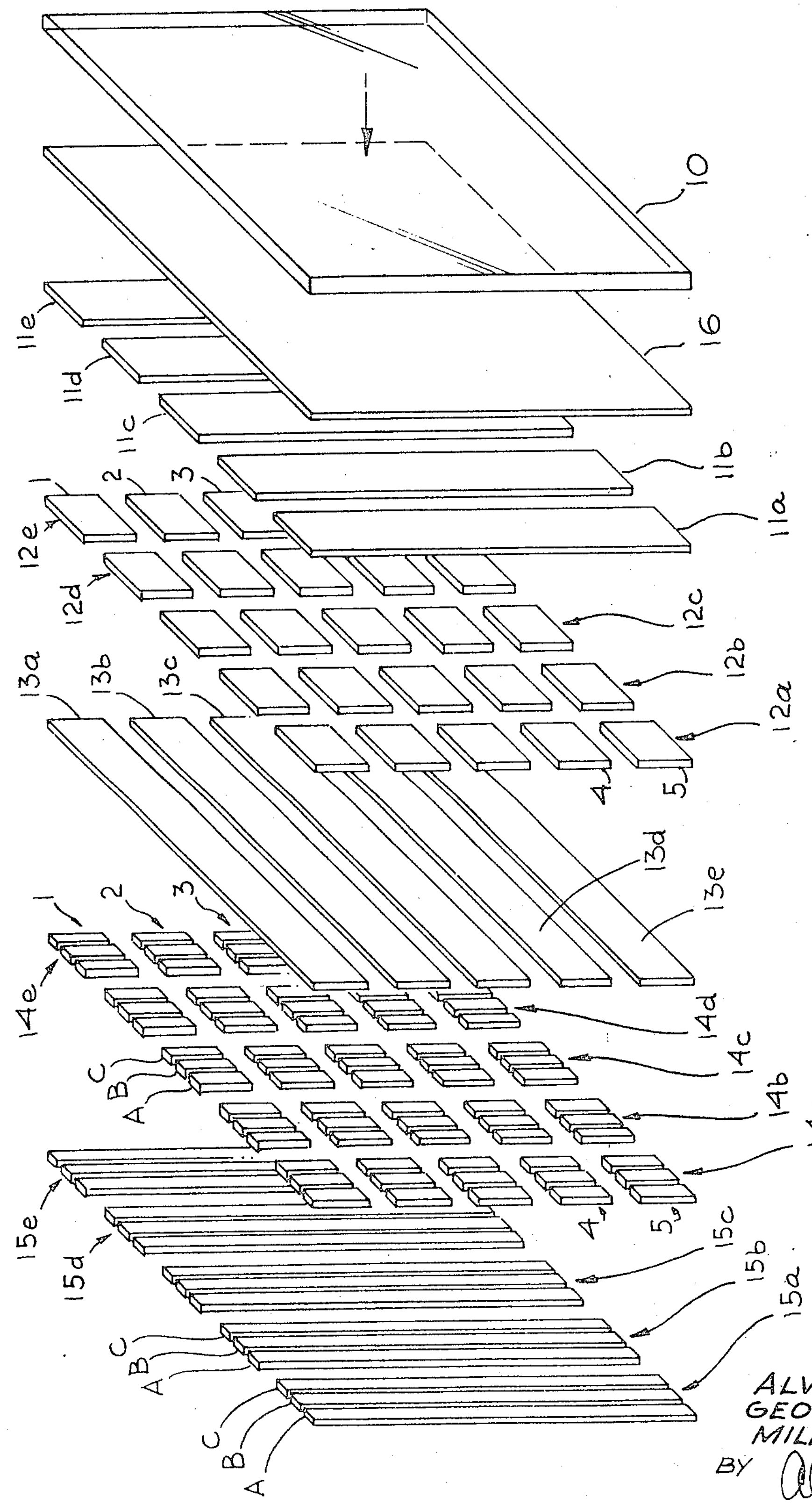
INVENTORS
ALVIN A. SNAPER
GEORGE D. GREGORY
MILES B. MUNROE
BY Allen E Botney
ATTORNEY

PLANAR RANDOM ACCESS FERROELECTRIC COMPUTER MEMORY

This invention relates in general to the storage of information and more particularly relates to the storage of digital information for use in digital computers. The invention relates to the storage media only and not to the selection, driving and detection circuitry, and is, therefore, analogous to the "core stack" in the magnetic core memory currently used throughout the digital computer industry.

Information is now stored internally in digital computers and peripherally for digital computers in a number of ways. The three most prevalent ways are: One, by aligning magnetic domains in magnetic (ferrite) cores, sheets, rods, wires, tapes, discs and drums; Two, by mechanically, optically or electrically punching or burning holes in cards or tapes of various materials; and, Three, by the steering of electrical current through selected transistors, integrated circuits, diodes and other forms of semi-conductors. Other forms of memories coming into being utilize the optical properties of coherent light laser beams shining through holograms, with the hologram as the storage media. Other methods of digital storage now considered obsolete include the storage of electrical charge on the face of a cathode ray (Williams) tube and the storage of the information sonically in magnetostrictive delay lines and glass block delay lines.

The information thus stored in these memories is extracted for use by examining the storage media. More particularly, where data is magnetically stored, either a change in magnetic flux is obtained by electrically pulsing the magnetic core, sheet, rod, or wire to cause the selected magnetic domain to reverse its polarity or "flip", thereby causing the erasure of the information being accessed, or else the magnetic domain is read out by mechanically moving the magnetic tape, disc, or drum past a static reading head, thereby disallowing the random selection of the information with any amount of efficiency. Holes in tapes or cards, which represents fixed information, that is to say, information that cannot be erased or altered, are read mechanically by electrical contact through the holes or optically by detecting light shining through the holes. In the last case, stored data is retrieved by detecting the current flowing from a semi-conductor, flip-flip, or diode, where the information can be maintained only so long as the power to the memory remains uninterrupted. As is known by those skilled in the art, all of these devices require a large amount of electrical current in proportion to the voltage and thus can be classified as "current" devices.

Contrary to these prior techniques and devices, a planar memory according to the present invention utilizes electrical voltage both to store the information and to direct light to the proper area of storage during a data interrogation or "read" cycle. A planar memory according to the present invention also utilizes polarized or coherent light as the data transmission media during the read operation. The information is erasable and alterable, the information is retained during a power interruption or turn off, and the data is not destroyed during the read operation. Moreover, a planar memory according to the present invention can also be classified as a "-voltage" instead of a "current" device because the ratio of current to voltage is significantly lower than in the other devices. The essence of the invention lies in the fact that a change occurs in the birefringence characteristics of ferroelectric crystalline materials when they are stressed, with the result that the ferroelectric material acts upon the light impinging upon it in such a manner as to modify its intensity. This stressing, caused by the application of an electrical voltage across the ferroelectric material, can be reversed by the application of an equal but reverse polarity voltage across the ferroelectric material. The ferroelectric material holds the last stress imposed upon it after the voltage producing said stress is removed, thus performing the storage function.

It is, therefore, an object of the present invention to provide a planar, random access, computer memory utilizing ferroelectric materials.

It is another object of the present invention to provide a computer memory device that uses electrical voltage rather than electrical current as a means for storing information.

It is a further object of the present invention to provide an electro-optical computer memory in which data is stored by varying the birefringence of a material in the memory.

It is still another object of the present invention to provide a memory device based on the stressing of a ferroelectric material.

It is still a further object of the present invention to provide a computer memory device in which the information is at all times erasable and alterable, in which the information is retained during a power interruption or turn off and in which the data is not destroyed during the read operation.

It is another and further object of the present invention to provide an extremely fast operating, highly compact and high storage density memory device.

It is still another and further object of the present invention to provide a memory device in which information is stored and read out by varying the intensity of light passing through the storage medium.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

The drawing itself presents an exploded view of a specific embodiment of a memory device according to the present invention.

Referring now to the drawing, it should be mentioned at the outset that for sake of clarity the embodiment illustrated therein has been simplified by removing from the memory plane the photodetector strips (or individual photodetectors) and the opaque, high dielectric material used to surround the areas of ferroelectric material and between the strips of transparent conductor material. The memory plane is constructed as a multi-layered device with all the layers deposited sequentially, in a sandwich arrangement, on a substrate 10 that is preferably made of glass or quartz. However, any other substrate materials that are optically transparent and compatible with the tranSparent conductors and opaque, high dielectric material are acceptable since the only function of the substrate is mechanical strength. Each of the layers deposited on the substrate is typically 50 to 100 millionths of an inch in thickness, and any method of deposition capable of achieving these thicknesses may be utilized, provided that the deposition process allows the ferroelectric material to recrystallize in the preferred crystalline orientation. The preferred method of deposition, which is well known, is by R.F. (radio frequency) sputtering.

The layers deposited on substrate 10 and the sequence in which they are deposited is as follows.

First, a plurality of transparent conductors 11*a*–11*e* are deposited using stannic oxide or some other suitable transparent conductor material, a masking technique being used to achieve the strip pattern shown in the figure. After these transparent conductors are deposited, a reverse mask is then used to deposit opaque, high dielectric material, such as tantalum oxide, between the strips of transparent conductors to the same thickness as the transparent conductors. As previously indicated, the dielectric material is not shown in the figure to simplify the drawing and thereby achieve as much clarity as possible.

Second, deposit a layer of ferroelectric material, such as barium titanate or lead zirconate, over the layer of transparent conductors. Then, using an appropriate mask, sputter etch away the unwanted ferroelectric material to form the isolated squares of ferroelectric material shown in the figure. As shown, these squares of ferroelectric material are arranged in columns and rows, there being as many such columns as there are strips of transparent conductors. Accordingly, the several columns of these squares of ferroelectric material have been generally designated 12a–12e with the squares in each such column being designated 1–5. After the unwanted ferroelectric material has been etched away to form the abovesaid squares, those same regions are filled in with opaque high dielectric material so that each square area of ferroelectric material is surrounded by this opaque dielectric to the same thickness. For this purpose, the same mask can be used that was used to form the squares in the first place.

Third, another plurality of transparent conductors, designated 13a–13e, are deposited in a manner identical with that used in step One, except, however, that the strips of transparent conductors 13a–13e are deposited crosswise to conductors 11a–11e. It should also be mentioned at this point that while ferroelectric columns 12a–12e are respectively aligned with conductor strips 11a–11e, conductor strips 13a–13e overlie or are aligned with the ferroelectric rows designated 1–5, that is to say, conductor strip 13a overlies all those ferroelectric elements designated 1, conductor strip 13b overlies all ferroelectric elements designated 2, conductor strip 13c overlies all ferroelectric elements designated 3, etc.

Fourth, deposit the ferroelectric memory bits in a manner identical with that used in step Two, namely, in columns and rows. The columns of memory bits are generally designated 14a–14 whereas the horizontal rows in which these memory bits are arranged are generally designated 1–5. As may be seen from the figure, in the embodiment illustratively shown therein there are three memory bits per memory word and in each such word unit these memory bits have been designated A, B and C. Stated differently, each column of columns 14a–14 is broken down into three narrower or thinner columns respectively designated A, B and C. As before, the ferroelectric material deposited may be either barium titanate or lead zirconate.

Fifth, several columns of transparent conductors are deposited over memory columns 14a–14e in a manner identical with that used in step One, these columns of conductors generally being designated 15a–15e. Each of these columns is divided into three narrower or thinner conductors designated A, B and C with the A, B and C conductors respectively overlying the A, B, and C memory bits in columns 14a–14e. Needless to say, conductor columns 15a–15e are insulated from each other as are the conductor elements A, B and C therein.

Sixth, photodetectors, such as cadmium sulfide, are either deposited or attached in line with the conductors of columns 15a–15 and the ferroelectric memory bits. As previously explained, the photodetector strips (or individual photodetectors) have been omitted from the drawing.

Those skilled in the art will recognize that this drawing illustrates a memory consisting of 25 words of three bits each for a total of 75 bits. However, the memory may be constructed in any size, some typical sizes being: 65,536 words of 36 bits each or 2,359,296 bits total; 4,096 words of 16 bits each or 65,536 bits total; 1,024 words of 8 bits each or 8,192 bits total; and any other number of words of any bit length each. It should also be mentioned at this time that a polarizer 16 may be included between the first layer and substrate 10, as shown in the figure, but will more likely be outside the memory plane associated with the light source.

Considering now the operation of a memory device according to the present invention, to store information, consider the application of a positive voltage to the A and C conductors in column 15c and a negative voltage to the B conductor of this column. Also consider the application of a ground potential to conductor 13c. The ferroelectric bits defined by the intersection of the conductors thusly activated, namely, ferroelectric bits A. B and C lying in column 14c and row 3, will stress in such a manner as to respectively allow a higher light intensity, lower light intensity, and higher light intensity due to the positive, negative and positive fields impressed upon them. The voltage field, of course, varies across the length of the whole conductor, but due to the geometrical fact that the ferroelectric area is much greater than the ferroelectric thickness, only the area defined by the intersection of the conductors receives sufficient electrical field to be activated. When the voltage and grounds are removed from the conductors, the ferroelectric bits retain the above-mentioned stresses imposed upon them. Accordingly, all bits in the memory may thus be said to pass one of two intensities of light depending upon the voltage impressed upon them. As a practical matter, the memory bits are set in word groupings, in this case, word groups of three.

To read or have access to the information, consider the application of a positive voltage to conductor 11c and a ground potential to conductor 13c. As a result, a voltage potential is placed across the ferroelectric area defined by the intersection of conductors 11c and 13c, namely, ferroelectric area 3 in column 12c, thereby causing this area to stress and pass a higher intensity light. Needless to say, due to the segregating effect of the surrounding opaque dielectric material, this higher intensity light is so channeled that it appears only at the memory bits directly in line, namely, memory bits A, B and C in column 14c and row 3. It will be remembered that these memory bits were previously set so as to pass either a higher intensity or a lower intensity light. Thus, it can be observed that the photodetectors (not shown) will see three intensities of light, as follows:

1. Both the bit and the word passing the low intensity light;
2. Either the word or the bit passing the higher intensity light and the other the opposite; and
3. Both the bit and the word passing the higher intensity light.

These three beams are detected as low, medium and high, with only the high intensity beam being considered a "one" bit of information and both the low and medium beams being considered "zero" bits of information. Thus, for the bit and word setting described previously, the output would be a "one-zero-one" (101).

In order to understand why there are three levels of intensity, consider the fact that the ferroelectric crystalline areas of planes 12 and 14 are each capable of passing two intensities of light depending on the voltage impressed upon the given area. We can define these intensities as 1 (no loss of intensity) for the ON state and $1/x$ (reduced intensity) for the OFF state. X represents the light to dark ratio of the ON to OFF states.

Consider now that the "bits," that is to say, the ferroelectric areas of plane 14, have been definitely set to OFF and ON states representing the ZEROS and ONES of the various words in the memory and are thus capable of passing intensities of $1/x$ or 1 depending upon their respective settings. Further consider that the "words," that is to say, the ferroelectric areas of plane 12, are all set to the OFF configuration representing the memory state during which *no* word access is being made. Accordingly, light passing through plane 12 is attenuated and illuminates plane 14 uniformly with an intensity of $1/x$. This light, further passing through plane 14 (the bits), is or is not further attenuated depending upon the setting of the various bits as described above. Thus the light reaching the photodetectors can have one of two possible intensities: $1/x \times 1/x = 1/x^2$ if the bit is OFF or set to ZERO, and $1/x \times 1 = 1/x$ if the bit is ON or set to ONE.

Now consider the case where a word access is being made by the memory. A specific area of plane 12, namely, a word such as 12a,5 (column 12 a, line 5), is set ON with the remaining areas of plane 12 left OFF. The light intensity illuminating the area of plane 14 defined as 14a,5 (column 14a, line 5) now increases from $1/x$ to 1 while the illumination over the rest of the plane remains at $1/x$. The light passing through these particular bits to the photodetectors can again have one of two possible intensities: $1 \times 1/x = 1/x$ if the bit is OFF or set to ZERO, and $1 \times 1\ 1$ if the bit is ON or set to ONE.

Thus, we see that it is possible for a photodetector behind any given ferroelectric area in plane 14 (a bit) to detect three intensities of light: $1/x^2$ when both the bit and the word are OFF, $1/x$ when either the word is OFF and the bit is ON or conversely when the word is ON and the bit is OFF, and 1 when both the bit and the word are ON.

For practical purposes during actual usage, the intensities $1/x^2$ and $1/x$ are both considered a ZERO for output and only the intensity 1 is considered a ONE.

Considering the operation still further, the application of a negative voltage on conductor 11*c* and a ground potential on conductor 13*c* reverses the potential on the ferroelectric area 3 in column 12*c*, thereby reversing the stress on the ferroelectric and causing the lower intensity light to again be transmitted, the lower intensity light being, of course, the normal non-reading condition for this ferroelectric layer. Thus, the three layers comprising conductors 11*a*–11*e* and 13*a*–13*e* and the intermediate ferroelectric columns 12*a*–12*b* form a series of "light gates" or light modulators that allow higher intensity light to be selectively switched from area to area as each particular grouping of bits are accessed. It can be seen that any particular light gate can be activated at any particular time (random access) and that the storage, erasure, and modification of data can be interspersed with the reading or accessing of information. It can also be seen that since the information is detected by shining coherent or polarized light through the selected ferroelectric bits, the act of reading or accessing information does not destroy the information. It can be further seen that since only the application of an equal but opposite polarity voltage can change the stressing of a given ferroelectric area that the removal or interruption of the voltage to the memory plane does not effect the data already stored therein.

Although a particular arrangement of the invention has been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A planar random access computer memory device using electrical voltages to store information and light as the medium for reading out the stored information, said memory device comprising: first and third layers that respectively include first and third pluralities of transparent electrical conductor strips to which the voltages are selectively applied, said third plurality of conductor strips extending crosswise to said first plurality of conductor strips; a second layer interposed between said first and third layers, said second layer including a plurality of ferroelectric areas arranged in a plurality of columns and rows, said columns respectively being aligned with the strips of said first layer and said rows respectively being aligned with the strips of said third layer, the ferroelectric areas of said second layer being selectively operable, when the voltages are selectively applied to the strips of said first and third layers, to stress in one of two directions to respectively pass one of two different intensities of light therethrough; a fourth layer superimposed upon said third layer and including a plurality of groups of ferroelectric memory bits arranged in a plurality of columns and rows, said columns and rows of said groups respectively being aligned with the columns and rows of said ferroelectric areas in said second layer, each of said groups including a number of said ferroelectric bits that are operable, when voltages are selectively applied thereto, to be stressed in one of two directions to respectively pass one of two different intensities of light therethrough, each of said groups, when the ferroelectric bits therein are stressed in said manner, passing light at said different intensities therethrough in accordance with a predetermined binary code; and a fifth layer superimposed upon said fourth layer and including a plurality of transparent electrical conductors arranged to form a plurality of columns that are aligned with the columns of said fourth layer, the conductors in each column of said fifth layer being aligned with the ferroelectric bits in the corresponding column in said fourth layer, the voltages being selectively applied to the conductors of said third and fifth layers to selectively stress the ferroelectric bits in said fourth layer.

* * * * *